(12) United States Patent
Farrugia et al.

(10) Patent No.: US 10,184,024 B2
(45) Date of Patent: Jan. 22, 2019

(54) CARMINE COLORANTS

(71) Applicant: Xerox Corporation, Norwalk, CT (US)

(72) Inventors: Valerie M Farrugia, Oakville (CA);
Maria Birau, Mississauga (CA);
Gabriel Iftime, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 602 days.

(21) Appl. No.: 13/920,164

(22) Filed: Jun. 18, 2013

(65) Prior Publication Data

US 2014/0371419 A1 Dec. 18, 2014

(51) Int. Cl.
*C08G 63/68* (2006.01)
*C08G 63/668* (2006.01)

(52) U.S. Cl.
CPC .......... *C08G 63/668* (2013.01); *C08G 63/68* (2013.01)

(58) Field of Classification Search
CPC .............................. C08G 63/68; C08G 63/668
USPC ........................................... 524/600; 528/127
See application file for complete search history.

(56) References Cited

U.S. PATENT DOCUMENTS

| | | | | | |
|---|---|---|---|---|---|
| 3,278,486 | A | * | 10/1966 | Meek | C08G 18/00 521/157 |
| 4,636,261 | A | * | 1/1987 | Heinze | A23G 3/343 106/402 |
| 4,804,719 | A | * | 2/1989 | Weaver | C08G 69/44 525/420 |
| 5,147,673 | A | * | 9/1992 | Schul | A23L 1/2756 426/250 |
| 2003/0204029 | A1 | * | 10/2003 | Brandenburg | C08G 63/668 525/444 |
| 2006/0089421 | A1 | * | 4/2006 | Vasudevan | C09B 68/20 523/160 |
| 2011/0212396 | A1 | * | 9/2011 | Farrugia | C08G 63/672 430/108.4 |
| 2014/0342280 | A1 | * | 11/2014 | Farrugia | C08G 63/199 430/108.4 |

* cited by examiner

*Primary Examiner* — Jane L Stanley
(74) *Attorney, Agent, or Firm* — Marylou J. Lavoie, Esq. LLC

(57) ABSTRACT

The present disclosure provides a modified carmine which can comprise polymers, such as, polyesters, or conjugating molecules, such as, polycarboxylic acids.

16 Claims, No Drawings

CARMINE COLORANTS

FIELD

Biobased colorants comprise the naturally-derived coloring moiety, carmine. Carmine-based colorants may be used to make colored polymers, such as, polyester polymers, producing, for example, red-colored polyester polymers.

BACKGROUND

Polymers often are mixed with a colorant to produce the range of known colored plastics, materials and the like. However, there are shortcomings in using colorants with polymers. For example, pigments can be difficult to disperse in a solvent, and that dispersion or suspension then must be one which can be incorporated with a polymerization reaction or must separately be mixable with the polymer and interact with the polymer. Dyes, while soluble, also have shortcomings, such as, poor thermal stability and poor lightfastness.

With an increased focus on environment and health, there is an interest and/or a need to find suitable reagent replacements for petroleum-based reagents and certain colorants associated with polymer synthesis and use. It is desirable, then, to provide biorenewable regents, such as, colorants with a lower negative impact on the environment and on health with improved thermal and temporal stability and lightfastness.

SUMMARY

The instant disclosure provides a red/orange/purple colorant (depending on the pH) comprising a modified carmine, which finds use in coloring polymers, which can be used in inks, plastics, paints, extruded products, injection molded products, cloths, ropes, toners, containers, screens, data storage devices and so on, without the need for an extra coloring step. The modified carmine can be bound to a compound, a polymer and so on.

DETAILED DESCRIPTION

I. Introduction

The present disclosure provides a novel biobased colorant. The colorant consists of a naturally-derived coloring molecular moiety, carmine, which also is called Crimson Lake, Cochineal, Natural Red 4, C.I. 75470 or E120. The natural, bright red colored pigment is the aluminum salt of carminic acid, which is produced by some scale insects, such as, the cochineal scale and the Polish cochineal. Carmine is used in the manufacture of artificial flowers, paints, crimson ink, rouge and other cosmetics and is routinely added to food products, such as, yogurt and juice, that require a distinctive ruby red color.

Carmine (or cochineal) is obtained from the female insect, Coccus cacti or Dactylopius coccus, or eggs of those species. The carapace of female insects is dried, then the carminic acid is extracted in a solvent and isolated from insoluble material. The clear solution is then treated with an aluminum-containing compound, such as, alum, or with another precipitant and then combined with an aluminum-containing compound to form carmine. Carmine is orange in acidic medium (pH 3), red in nearly neutral medium (pH 5.5) and purple at about pH 7.

Carmine is one of the few natural and water-soluble colorants that resist degradation over time. Carmine is light-stable and heat-stable, and is oxidation-resistant. Carminic acid is 7-α-D-glucopyranosyl-9,10-dihydro-3,5,6,8-tetrahydroxy-1-methyl-9,10-dioxoanthracenecarboxylic acid.

In embodiments, carmine (or carminic acid) is included as a polyol reagent in a polymerization reaction, such as, a polyester polycondensation reaction mixture to form a red-colored polyester polymer, which can be molded, melted, spun etc. into the desired form of interest. The carmine, in the case of a polyester reaction, can be an integral part of the polymer backbone or can be covalently attached to a suitable reactive site on the polymer chain, retaining the red color. Any polymer with a suitable site reactive with a carmine can be used.

Unless otherwise indicated, all numbers expressing quantities and conditions, and so forth used in the specification and claims which relate to known metrics determinable by methods known in the art are to be understood as being modified in all instances by the term, "about." "About," is meant to indicate a variation of no more than 10% from the stated value. Also used herein is the term, "equivalent," "similar," "essentially," "substantially," "approximating," and "matching," or grammatical variations thereof, which have generally acceptable definitions or at the least, are understood to have the same meaning as, "about."

In the application, use of the singular includes the plural unless specifically stated otherwise. In the application, use of, "or," means, "and/or," unless stated otherwise. Furthermore, use of the term, "including," as well as other forms, such as, "includes," and, "included," is not limiting.

As used herein, "biobased" means a product that is composed, in whole or in substantial part (e.g., at least about 50%, at least about 60%, at least about 70%, at least about 80%, at least 90% by weight of the product), of biological product(s), including plant, animal and marine materials. Generally, a biobased material is biodegradable, that is, substantially or completely biodegradable, by substantially is meant greater than 50%, greater than 60%, greater than 70% or more of the material is degraded from the original molecule to another form by a biological or environmental means, such as, action thereon by bacteria, animals, plants and so on in a matter of days, matter of weeks, a year or more, but generally not more than five years.

A, "polyacid," is a monomer for forming a polyester polymer for toner that comprises at last two reactive acidic groups, such as, a carboxylic acid group, at least three acidic groups or more. A diacid, a triacid and so on are embodied by a polyacid. Thus, a, dicarboxylic acid, a tricarboxylic acid, a, "polycarboxylic acid," is an example of a polyacid, and comprises a molecule with two, three or more reactive carboxylic acid groups or moieties.

A, "polyol," is a monomer for forming a polyester polymer for toner that comprises at least two reactive hydroxyl groups, such as, an alcohol, at least three hydroxyl groups or more. Hence, a dialcohol or diol, a trialcohol or triol and so on are encompassed by a polyol.

For the purposes herein, a polymer is aid to comprise a reactant used to form or to yield said polymer, although once incorporated into the polymer, that reactant may no longer comprise the same molecular formula. Hence, for example, a polyester polymer generally is formed by reacting an alcohol with an acid. That reaction commonly involves loss of a water molecule in a condensation reaction. Nevertheless, for the purposes of the instant disclosure, although the two adjoining alcohol and acid reactant collectively have lost a water molecule, that polyester is said to comprise the alcohol and the acid reactant. Thus, if an isosorbide molecule is reacted with azelaic acid to form a polyester, that polyester is said to comprise azelaic acid and isosorbide.

A, "carmine," is any form of an aluminum salt of carminic acid which comprises a red color at a slightly acidic pH greater than about 4 and less than about 6.5, or a modified form thereof which has a red color in that pH range. An example of a modified form of carmine or, "modified carmine," is a conjugate of carmine and a conjugating molecule, such as, a carboxylic acid or a polycarboxylic acid, such as, succinic acid, oxalic acid, malonic acid, glutaric acid, adipic acid, pimelic acid, suberic acid, azelaic acid, sebacic acid, phthalic acid, maleic acid, fumaric acid, glutaconic acid, traumatic acid, muconic acid, citric acid, isocitric acid, aconitic acid, trimesic acid, mellitic acid and so on. A single or plural conjugating molecules can be mixed with a carmine moiety in various ratios as a design choice, such as, a single carmine moiety bound to a single conjugating moiety, a carmine moiety in a ratio to a conjugating moiety of from 2:1 to about 100:1 or more, to 1:2 to about 1:100 or more. Also, plural molecules can be mixed with plural carmine moieties to form an aggregate or network in various ratios as a design choice. Other forms of modified carmine comprise polymers. Hence, for example, a carmine can be incorporated as a monomer of a polymer during an ester polycondensation reaction to produce a polyester polymer with a red color, resulting, for example, in red/magenta-colored polymers. Varying amounts of carmine can be incorporated as a polyol in the esterification reaction as a design choice. Alternatively, the conjugating molecule comprises a polymer, which is mixed with carmine to enable addition reaction of the carmine(s) to the polymer. Hence, the one or more carmine moieties can comprise a pendant group or groups of the polymer. Varying numbers and amounts of carmine can be added to a polymer as a design choice. A modified carmine can contain any relative molar combination of carmine to conjugating molecule or monomer, essentially any non-carmine molecule, as a design choice. Hence, the ratio of carmine to non-carmine molecule can range from about 0.01 mole % to about 99.99 mole %; to from about 99.99 mole % to about 0.01 mole %, and all ratios between those limits, as a design choice.

II. Polymers

Any polymer that comprises a polyol monomer component or comprises pendant groups reactive with a hydroxyl group can be used to react with carmine. The disclosure will be exemplified for polyester polymers.

A polyester resin may be obtained synthetically, for example, in an esterification reaction involving a reagent comprising a polyacid and another reagent comprising a polyol. In embodiments, the alcohol reagent comprises three or more hydroxyl groups, in embodiments, four or more hydroxyl groups, or more. In embodiments, the polyacid comprises three or more carboxylic acid groups, in embodiments, four or more carboxylic acid groups, or more. Reagents comprising three or more functional groups enable, promote or enable and promote polymer branching and crosslinking.

Examples of polyols which may be used in generating an amorphous polyester resin include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, 1,4-cyclohexanedimethanol, 1,3-cyclohexanedimethanol, xylenedimethanol, cyclohexanediol, diethylene glycol, bis(2-hydroxyethyl)oxide, dipropylene glycol, dibutylene glycol and combinations thereof. The amount of polyol may vary, and may be present, for example, in an amount from about 40 to about 60 mole % of the resin, from about 42 to about 55 mole % of the resin, from about 45 to about 53 mole % of the resin.

Examples of polyacids or polyesters that can be used to produce an amorphous resin include terephthalic acid, phthalic acid, isophthalic acid, fumaric acid, trimellitic acid, diethyl fumarate, dimethyl itaconate, cis-1,4-diacetoxy-2-butene, dimethyl fumarate, diethyl maleate, maleic acid, succinic acid, itaconic acid, succinic acid, cyclohexanoic acid, succinic anhydride, dodecylsuccinic acid, dodecylsuccinic anhydride, glutaric acid, glutaric anhydride, adipic acid, pimelic acid, suberic acid, azelaic acid, dodecanedioic acid, dimethyl naphthalenedicarboxylate, dimethyl terephthalate, diethyl terephthalate, dimethylisophthalate, diethylisophthalate, dimethylphthalate, phthalic anhydride, diethylphthalate, dimethylsuccinate, naphthalene dicarboxylic acid, dimer diacid, dimethylfumarate, dimethylmaleate, dimethylglutarate, dimethyladipate, dimethyl dodecylsuccinate and combinations thereof.

For forming a crystalline polyester resin, suitable polyols include aliphatic polyols with from about 2 to about 36 carbon atoms, such as, 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like; alkali sulfo-aliphatic diols, such as, sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixtures thereof and the like, including structural isomers thereof.

Examples of polyacid or polyester reagents for preparing a crystalline resin include oxalic acid, succinic acid, glutaric acid, adipic acid, suberic acid, azelaic acid, sebacic acid, fumaric acid, dimethyl fumarate, dimethyl itaconate, cis-1, 4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid, mesaconic acid, a polyester or anhydride thereof; an alkali sulfo-organic polyacid, such as, the sodio, lithio or potassio salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfo-p-hydroxybenzoic acid, N,N-bis(2-hydroxyethyl)-2-amino ethane sulfonate, or mixtures thereof. The polyacid may be selected in an amount of, for example, in embodiments, from about 40 to about 60 mole %, from about 42 to about 52 mole %, from about 45 to about 50 mole %. Optionally, a second polyacid may be selected in an amount from about 0.1 to about 10 mole % of the resin.

In embodiments, a portion of the polyol reagent in an esterification reaction can comprise a carmine, in varying amounts as a design choice, the carmine comprising the backbone of a polyester polymer in the varying amounts based on the amount of carmine and an optional another polyol included in the esterification reaction.

Polyester polymers are known and if a polymer comprises a group reactive with a hydroxyl group, such as, an acid group, such as, a carboxylic acid group, that polymer can be used as a conjugating molecule and can be combined with a carmine, where the carmine covalently binds to the group reactive with a hydroxyl group. Varying amounts of carmine can be incorporated in the addition reaction to impart a red color on the polymer.

b. Polyester Catalyst

Condensation catalysts which may be used in the polyester reaction include tetraalkyl titanates; dialkyltin oxides, such as, dibutyltin oxide; tetraalkyltins, such as, dibutyltin dilaurate; dibutyltin diacetate; dialkyltin oxide hydroxides, such as, butyltin oxide hydroxide; aluminum alkoxides, alkyl zinc, dialkyl zinc, zinc oxide, stannous oxide, stannous chloride or combinations thereof. In embodiments, such catalysts may include butylstannoic acid (Fascat 4100®) and dibutyltin oxide (Fascat 4201®), Arkema Inc., Philadelphia, Pa.

Such catalysts may be used in amounts of, for example, from about 0.01 mole % to about 5 mole % based on the amount of starting polyacid, polyol or polyester reagent in the reaction mixture.

c. Polyester Crosslinking

In embodiments, the polymer may be a crosslinked. A crosslinkable polymer can comprise, for example, a crosslinkable group or groups, such as, a C=C bond, or a pendant group or side group, such as, a carboxylic acid group. The polymer may be crosslinked, for example, through a free radical polymerization with an initiator.

i. Initiator

Suitable initiators include peroxides, such as, organic peroxides or azo compounds, for example diacyl peroxides, such as, decanoyl peroxide, lauroyl peroxide and benzoyl peroxide, ketone peroxides, such as, cyclohexanone peroxide and methyl ethyl ketone; alkyl peroxy esters, such as, t-butyl peroxy neodecanoate, 2,5-dimethyl 2,5-di(2-ethyl hexanoyl peroxy)hexane, t-amyl peroxy 2-ethyl hexanoate, t-butyl peroxy 2-ethyl hexanoate, t-butyl peroxy acetate, t-amyl peroxy acetate, t-butyl peroxy benzoate and t-amyl peroxy benzoate; alkyl peroxides, such as, dicumyl peroxide, 2,5-dimethyl 2,5-di(t-butyl peroxy)hexane, t-butyl cumyl peroxide, bis(t-butyl peroxy)diisopropyl benzene, di-t-butyl peroxide and 2,5-dimethyl 2,5-di(t-butyl peroxy) hexyne-3; alkyl hydroperoxides, such as, 2,5-dihydro peroxy 2,5-dimethyl hexane, cumene hydroperoxide, t-butyl hydroperoxide and t-amyl hydroperoxide, and alkyl peroxyketals, such as, n-butyl 4,4-di(t-butyl peroxy)valerate, 1,1-di(t-butyl peroxy) 3,3,5-trimethyl cyclohexane, 1,1-di(t-butyl peroxy)cyclohexane, 1,1-di(t-amyl peroxy)cyclohexane, 2,2-di(t-butyl peroxy)butane, ethyl 3,3-di(t-butyl peroxy)butyrate and ethyl 3,3-di(t-amyl peroxy)butyrate; azobis-isobutyronitrile, 2,2'-azobis(isobutyronitrile), 2,2'-azobis(2,4-dimethyl valeronitrile), 2,2'-azobis(methyl butyronitrile), 1,1'-azobis(cyano cyclohexane), 1,1-di(t-butyl peroxy)-3,3,5-trimethylcyclohexane, combinations thereof and the like. The amount of initiator used is proportional to the degree of crosslinking, and thus, the gel content of the polymer. The amount of initiator used may range from, for example, about 0.01 to about 10 weight %, from about 0.1 to about 5 weight % of the polymer. In the crosslinking, it is desirable that substantially all of the initiator be consumed. The crosslinking may be carried out at high temperature and thus, the reaction may be rapid.

ii. Polyfunctional Reagents

One or more reagents that comprise at least three functional groups can be incorporated into a polymer or into a branch to enable branching, further branching and/or crosslinking. For example, in the case of a polyester, such polyfunctional monomers include 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane and 1,2,7,8-octanetehtacarboxylic acid, acid anhydrides thereof, lower alkyl esters thereof and so on. The branching agent may be used in an amount from about 0.01 to about 10 mole %, from about 0.05 to about 8 mole %, from about 0.1 to about 5 mole %.

Generally, as known in the art, the polyacid and polyol reagents are mixed, optionally with a catalyst, and incubated at an elevated temperature, such as, from about 180° C. or more, from about 190° C. or more, from about 200° C. or more, and so on, which may be conducted anaerobically, to enable esterification to occur until equilibrium, which generally yields water or an alcohol, such as, methanol, arising from forming the ester bonds in esterification reactions. The reaction may be conducted under vacuum to promote polymerization. The product is collected by practicing known methods, and may be dried, again, by practicing known methods to yield particulates.

Thus, a carmine is included in the reaction mixture of the polyacid/polyester and polyol, and any other reagents are included, such as, a catalyst. The mixture is then incubated under conditions that promote the condensation reaction to occur. Alternatively, a carmine is mixed with a polymer to enable addition of one or more carmine residues onto or to the polymer.

III. Modified Carmine

The plural hydroxyl groups of carmine enable formation of modified carmine molecules and aggregate molecules comprising plural carmine molecules. Such aggregates or modified carmine molecules can be used as a reagent to introduce carmine residues into or onto a molecule or composition. The modified carmine and aggregates are stable and can have enhanced compatibility with other materials by virtue of the molecules conjugated to the carmine moiety or moieties. The modified carmine and smaller aggregates can be water soluble whereas larger aggregates may form networks or particulates in solution.

Hence, molecules that react with hydroxyl groups can be used as conjugating molecules to form the modified carmine molecules or carmine aggregates. Examples of conjugating molecules include acids, amines and so on. In embodiments, the reagent can comprise plural groups reactive with hydroxyl groups. In embodiments, the reagent is one obtained from a biological source or is biodegradable. Examples of suitable reagents include carboxylic acids, diacids and the like, such as, amino acids, acetic acid, oxalic acid, benzoic acid, lauric acid, myristic acid, palmitic acid, stearic acid, succinic acid, glutaric acid, adipic acid, pimelic acid, suberic acid, azelaic acid, citric acid, isocitric acid, aconitic acid, mellitic acid and so on. In embodiments, the molecule conjugated to one or more carmine moieties comprises a polymer, such as, a polyester. Generally, the reaction merely requires suspending and mixing the carmine and conjugating reagent in a suitable buffer and allowing the addition reaction to occur.

The red-colored polymers of interest can find use in any known use of such polymers, without the need to add a red colorant to obtain the final product. Hence, plastic materials, such as, sheets, containers, threads, yarns, materials, foams, seals, gaskets, durable plastics, adhesives, coatings, including extruded products, such as, tubes, rods and cylinders, and injection molded products, such as, toys, data storage devices and the like, and so on, can be made using the colorant of interest to obtain a red colored version thereof.

The following examples illustrate embodiments of the instant disclosure. The examples are intended to be illustrative only and are not intended to limit the scope of the present disclosure. Parts and percentages are by weight unless otherwise indicated.

EXAMPLES

Example 1 Synthesis of Carmine Polyester

A 250 ml round bottom flask (RBF) was charged with azelaic acid (AA, 44.7 mmol, 0.07 eq., 8.41 g), carmine (6.38 mmol, 0.01 eq., 3.14 g), succinic acid (SA, 287 mmol, 0.45 eq., 33.9 g), isosorbide (IS, 300 mmol, 0.47 eq., 43.8 g) and butyl(hydroxyl)stannanone catalyst (6.38 mmol, 0.01 eq., 1.333 g). The flask was fitted with an overhead stirrer, heating mantle, nitrogen line, condenser and Dean-Stark trap. The polymerization took place over a range of temperatures starting at 200° C. (4 hours) to 215° C. (3 hours). Water formed during the condensation polymerization and was collected in the trap. The polymer was discharged from the flask once the softening point (Ts) reached 59.1° C. The Ts of the resin was determined by the Mettler FP800 Thermosystem consisting of FP80 Central Processor and FP83 Dropping Cell. The temperature was programmed to increase at 1° C./min until the target Ts was reached.

Example 2 Synthesis of Carmine Polyester

A 250 ml RBF was charged with AA (38.3 mmol, 0.06 eq., 7.21 g), carmine (5.11 mmol, 0.008 eq., 2.51 g), SA (295 mmol, 0.462 eq., 34.8 g), IS (300 mmol, 0.47 eq., 43.8 g) and butyl(hydroxyl)stannanone catalyst (6.38 mmol, 0.01 eq., 1.333 g). The flask was fitted with an overhead stirrer, heating mantle, nitrogen line, condenser and Dean-Stark trap. The polymerization took place over a range of temperatures starting at 205° C. (8 hours) to 215° C. (3 hours). Water formed during the condensation polymerization and was collected in the trap. The polymer was discharged from the flask once the Ts reached 65.5° C.

Example 3 Synthesis of Carmine Polyester

A 250 ml RBF was charged with 1,9-nonanediol (400 mmol, 0.40 eq., 64.1 g), carmine (5.0 mmol, 0.005 eq., 2.46 g), SA (495 mmol, 0.495 eq., 58.5 g), IS (100 mmol, 0.10 eq., 14.61 g) and butyl(hydroxyl)stannanone catalyst (6.20 mmol, 0.0062 eq., 1.295 g). The flask was fitted with an overhead stirrer, heating mantle, nitrogen line, condenser and Dean-Stark trap. The polymerization took place over a range of temperatures starting at 205° C. (4 hrs) to 215° C. (5 hrs). Water formed during the condensation polymerization and was collected in the trap. The polymer was discharged from the flask once the softening point (Ts) reached 53.9° C.

Example 4 Synthesis of Carmine Polyester

A 250 ml RBF was charged with 1,9-nonanediol (278 mmol, 0.37 eq., 44.5 g), carmine (1.50 mmol, 0.002 eq., 0.739 g), SA (375 mmol, 0.50 eq., 44.3 g), IS (IS, 96 mmol, 0.128 eq., 14.03 g) and butyl(hydroxyl)stannanone catalyst (3.75 mmol, 0.005 eq., 0.783 g). The flask was fitted with an overhead stirrer, heating mantle, nitrogen line, condenser and Dean-Stark trap. The polymerization took place over a range of temperatures starting at 210° C. (12 hours) to 215-220° C. (10 hours). Water formed during the condensation polymerization and was collected in the trap. The polymer was discharged from the flask.

Example 5 Characterization of Carmine Polymers

Table 1 below shows analytical data for the carmine-based polymers. For comparison, similar data of a control biopolymer made from SA (0.415 eq), IS (0.488 eq) and AA (0.098 eq) along with a control low molecular weight amorphous polyester resin and a control high molecular weight resin are presented in the table as well. The morphology/structure of the carmine-containing polymers of Examples 1-4 was controlled by including either 1,9-nonanediol (crystalline) or azelaic acid (1,9-nonane diacid; amorphous) in the polymer. The polymers of Examples 3 and 4 display crystalline properties based on melting point.

TABLE 1

| Resin | Carmine | SA | Nona | AA | IS | Ts | AV | Mw | Mn | PDI | Tg | Tm |
|---|---|---|---|---|---|---|---|---|---|---|---|---|
| Low MW Control | 0 | 0 | 0 | 0 | 0 | 118 | 14.7 | 16470 | 4350 | 3.79 | 58.8 | |
| Hi MW Control | 0 | 0 | 0 | 0 | 0 | 129 | 12 | 105160 | 5150 | 20.4 | 55.7 | |
| Bio Control | 0 | .415 | 0 | .098 | .488 | 105.5 | 6.4 | 11500 | 4700 | 2.45 | 52.8 | |
| Ex 1 | .010 | .45 | 0 | .07 | .47 | 59.1 | 99.1 | 1437 | 927 | 1.35 | 19.7 | |
| Ex 2 | .008 | .462 | 0 | .06 | .47 | 65.5 | 89.8 | 1715 | 1084 | 1.61 | 24.2 | |
| Ex 3 | .005 | .495 | .40 | 0 | .10 | 53.9 | 7.1 | 32627 | 14438 | 2.26 | | 35.8 |
| Ex 4 | .002 | .50 | .37 | 0 | .128 | — | 8.4 | 34298 | 15663 | 2.19 | | 33.6 |

The four carmine-containing polymers of Examples 1-4 were applied as films on a heated gravure plate and applied as a print on Xerox Digital Color Elite paper substrate, as known in the art. Then, the spectral characteristics of the printed samples were measured with a GretagMacbeth Spectrolino spectrometer and the CIE L*a*b* values compared to that of the Pantone primary colors. The a*b* values of the polymers revealed coloration of red/magenta with little yellow.

Example 6 Production of Carmine Conjugate

A 100 ml RBF was charged with carmine (5 moles, 0.5 eq., 2.462 g) and SA (50 mmol, 5 eq., 5.90 g). The flask was fitted with an overhead stirrer, heating mantle, nitrogen line, condenser and Dean-Stark trap. The polymerization took place over a range of temperatures starting at 178° C. for 3 hrs. Water formed during the condensation polymerization and was collected in the trap. The resulting material can be used as a macromonomer for further polycondensation. Adding succinic acid to the pendant hydroxyl groups provides longer pendant chains on the carmine molecule to help provide a bit of flexibility, i.e., a flexible spacer.

It will be appreciated that various of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

All references cited herein are herein incorporated by reference in entirety.

We claim:

1. A compound comprising:
   a polymer having a backbone; and
   a modified carmine;
   wherein the modified carmine comprises at least one carmine moiety and at least one conjugating molecule; and
   wherein the modified carmine is (a) an integral part of the polymer backbone; or (b) wherein the modified carmine is covalently attached to a reaction site on the polymer.

2. The compound of claim 1,
   wherein the carmine moiety and the conjugating molecule are provided in a ratio of carmine moiety:conjugating molecule of from 2:1 to 100:1.

3. The compound of claim 1,
   the carmine moiety and the conjugating molecule are provided in a ratio of carmine moiety:conjugating molecule of from 1:2 to 1:100.

4. The compound of claim 1, wherein the polymer is a polyester.

5. The compound of claim 1, wherein the polymer is a biodegradable polyester.

6. The compound of claim 1, wherein the modified carmine comprises plural conjugating molecules and plural carmine moieties that form an aggregate or network.

7. The compound of claim 1, wherein the modified carmine is a conjugate of carmine moiety and a conjugating molecule wherein said conjugating molecule comprises a polycarboxylic acid.

8. The compound of claim 1, wherein the modified carmine is a conjugate of carmine moiety and a conjugating molecule wherein said conjugating molecule comprises succinic acid.

9. The compound of claim 1, wherein the modified carmine is a conjugate of carmine moiety and a conjugating molecule wherein said conjugating molecule comprises azelaic acid.

10. The compound of claim 1, wherein the modified carmine is a conjugate of carmine moiety and a conjugating molecule wherein said conjugating molecule comprises a carboxylic acid.

11. The compound of claim 1, wherein the modified carmine is a conjugate of carmine and a conjugating molecule comprising plural molecules of a polycarboxylic acid.

12. The compound of claim 11, wherein said polycarboxylic acid comprises succinic acid.

13. The compound of claim 11, wherein said polycarboxylic acid comprises azelaic acid.

14. The compound of claim 1, wherein the modified carmine is a conjugate of carmine moiety and a conjugating molecule comprising plural molecules of a carboxylic acid.

15. The compound of claim 1, wherein the polymer is a polyester comprising one or more of succinic acid, azelaic acid and isosorbide.

16. The compound of claim 1, wherein the modified carmine is orange when in a medium of about pH 3,
    wherein the modified carmine is red when in a medium of about pH 5.5, or
    wherein the modified carmine is purple when in a medium of about pH 7.

* * * * *